(12) United States Patent
Bowser, Jr. et al.

(10) Patent No.: US 9,963,372 B2
(45) Date of Patent: May 8, 2018

(54) MONOLITHIC REFRACTORY CROWN AND RIDER ARCHES FOR GLASS FURNACE REGENERATORS AND GLASS FURNACE REGENERATORS INCLUDING THE SAME

(71) Applicant: FOSBEL, INC., Brook Park, OH (US)

(72) Inventors: Alan E. Bowser, Jr., Brook Park, OH (US); Robert D. Chambers, Brook Park, OH (US); Lou Carolla, Brook Park, OH (US); Michael P. Smith, Brook Park, OH (US)

(73) Assignee: FOSBEL, INC., Brook Park, OH (US)

( * ) Notice: Subject to any disclaimer, the term of this patent is extended or adjusted under 35 U.S.C. 154(b) by 25 days.

(21) Appl. No.: 14/939,210

(22) Filed: Nov. 12, 2015

(65) Prior Publication Data

US 2016/0137540 A1 May 19, 2016

Related U.S. Application Data

(60) Provisional application No. 62/079,735, filed on Nov. 14, 2014.

(51) Int. Cl.
*C03B 5/237* (2006.01)

(52) U.S. Cl.
CPC .......... *C03B 5/2375* (2013.01); *Y02P 40/535* (2015.11)

(58) Field of Classification Search
CPC ..... C03B 5/2375; C03B 5/2353; F27D 1/042; F27D 1/022; F27D 1/0023; F27D 1/0026
USPC .................. 432/216; D15/144, 144.1, 144.2
See application file for complete search history.

(56) References Cited

U.S. PATENT DOCUMENTS

| 308,577 | A | 11/1884 | Richards |
| 674,093 | A | 5/1901 | Morison |
| 695,822 | A | 3/1902 | Moore |
| 951,012 | A | 3/1910 | Lamond |
| 1,530,628 | A | 3/1925 | Troutman |
| 1,815,905 | A | 7/1931 | Grilli |
| 1,856,473 | A | 5/1932 | Drain, Jr. |
| 1,887,704 | A | 11/1932 | Hugo |
| 1,902,348 | A | 3/1933 | Wagstaff |
| 2,115,962 | A | 5/1938 | Orme |
| 2,176,157 | A | 10/1939 | Tanner |
| 2,303,559 | A | 12/1942 | Kinney |

(Continued)

FOREIGN PATENT DOCUMENTS

| CN | 202403555 | 8/2012 |
| EP | 2 460 774 | 6/2012 |

(Continued)

OTHER PUBLICATIONS

UK Search Report for GB1500703.2 dated Aug. 4, 2015, one (1) page.

(Continued)

*Primary Examiner* — Alissa Tompkins
*Assistant Examiner* — John Bargero
(74) *Attorney, Agent, or Firm* — Nixon & Vanderhye P.C.

(57) ABSTRACT

Glass furnace regenerators having opposed pairs of side and end walls formed of refractory blocks, a crown arch assembly forming an arched roof of the regenerator, and a rider arch assembly forming an interior floor of the regenerator are provided, wherein at least one of the crown arch assembly and rider arch assembly is formed of adjacently positioned one-piece monolithic pre-cast structures of refractory materials.

12 Claims, 7 Drawing Sheets

(56) References Cited

U.S. PATENT DOCUMENTS

| | | | |
|---|---|---|---|
| 2,309,789 A | 2/1943 | Reintjes | |
| 2,337,605 A * | 12/1943 | Hogenson | C03B 5/00 65/136.2 |
| 2,405,363 A | 8/1946 | Lindemuth | |
| 2,438,814 A | 3/1948 | MacDonald | |
| 2,527,429 A | 10/1950 | Kennedy | |
| D169,508 S | 5/1953 | Kuhn | |
| 2,753,711 A | 7/1956 | Weber | |
| 2,793,022 A | 5/1957 | Harris | |
| 3,326,541 A | 6/1967 | Davies et al. | |
| D226,913 S | 5/1973 | San Antonio | |
| D245,999 S | 10/1977 | Strigle, Jr. | |
| 4,282,923 A | 8/1981 | Cheetham | |
| 4,479,777 A | 10/1984 | Simon | |
| 4,768,578 A | 9/1988 | Sulit | |
| 4,940,081 A | 7/1990 | Hyde | |
| 5,634,313 A | 6/1997 | Mogling | |
| 6,017,214 A | 1/2000 | Sturgulewski | |
| 6,187,148 B1 * | 2/2001 | Sturgulewski | C10B 15/02 137/625.47 |
| D542,405 S | 5/2007 | Esjunin | |
| D553,944 S | 10/2007 | Jou | |
| D571,184 S | 6/2008 | Ricereto | |
| 7,572,084 B2 * | 8/2009 | Robertson | E01F 5/005 14/24 |
| 8,641,940 B2 | 2/2014 | Degollado et al. | |
| D701,547 S | 3/2014 | Bei | |
| D701,548 S | 3/2014 | Bei | |
| D737,112 S | 8/2015 | Han | |

FOREIGN PATENT DOCUMENTS

| | | |
|---|---|---|
| GB | 730885 | 6/1955 |
| GB | 833238 | 4/1960 |
| GB | 972228 | 10/1964 |
| JP | H05-157458 | 6/1993 |

OTHER PUBLICATIONS

Design U.S. Appl. No. 29/514,724, filed Jan. 15, 2015.
Design U.S. Appl. No. 29/514,733, filed Jan. 15, 2015.
Search Report, PCT/US2015/060358 (dated Jan. 20, 2016).

* cited by examiner

MONOLITHIC REFRACTORY CROWN AND RIDER ARCHES FOR GLASS FURNACE REGENERATORS AND GLASS FURNACE REGENERATORS INCLUDING THE SAME

CROSS-REFERENCE TO RELATED APPLICATIONS

This application is based on and claims domestic priority benefits under 25 USC §119(e) from U.S. Provisional Application No. 62/079,735 filed on Nov. 14, 2014, the entire contents of which are expressly incorporated hereinto by reference.

FIELD

The embodiments disclosed herein relate generally to monolithic refractory components for constructing regenerator structures associated with glass furnaces. In especially preferred embodiments, monolithic refractory crown and rider (bearer) arches forming a component part of a glass furnace regenerator structure.

BACKGROUND

In the manufacturing process for making glass, raw materials including sand, lime, soda ash and other ingredients are fed into a furnace, sometimes called a glass tank. The raw materials are subjected to temperature above about 2,800° F. (approximately 1538° C.) in the glass furnace which causes the raw materials to melt and thereby form a molten bed of glass that exits the glass furnace for further downstream processing into glass products.

The most common way of heating the glass furnace is through the combustion of a hydrocarbon fuel source, such as natural gas or oil. The hydrocarbon fuel is mixed with combustion air inside the furnace and combusted to thereby transfer the combustion heat energy to the raw materials and glass melt prior to exiting the furnace.

In order to improve the thermal efficiency of the combustion process, the combustion air used to combust the fuel is preheated by means of regenerator structures. More specifically, a supply of combustion air is preheated in a honeycombed pack of checker bricks contained within the interior of the regenerator structure. More specifically, fresh combustion air is drawn up through the pack of heated checker bricks in the regenerator structure and preheated by means of heat transfer. The pre-heated combustion air may then be mixed with the fuel, combusted. Waste combustion gas exits the glass furnace and passes through a second regenerator structure. As the waste gasses pass through the second regenerator the checkers in the pack are heated by means of heat transferred from the waste gas. After a predetermined time has elapsed (e.g., after about 15-30 minutes), the process cycle is reversed so that the checker bricks in one of the regenerator structures that were being heated by heat transfer with the waste gas are then used to preheat the fresh combustion air while the checker bricks in the other regenerator structures that were used to preheat the combustion air are then re-heated by heat transfer with the waste combustion gas. See in this regard, U.S. Pat. No. 3,326,541 (the entire content of which is expressly incorporated hereinto by reference).

The current process for building glass regenerator structures is very labor intensive taking many weeks as it requires the placement of hundreds of thousands of refractory bricks to be individually coated with mortar and placed. As is well known in the glass making industry, the mortar joints associated with the walls of the regenerator structure are the weakest part of the structure and are consequently more readily susceptible to degradation by the corrosive hot gasses passing through the regenerator. As the brick joints begin to erode, the walls forming the regenerator structure face increased attack as the corrosive gasses begin to condense and dissolve the refractory materials of the walls thereby weakening the structure. As the structure becomes weakened, the glass furnace itself may become compromised and fail which could then require a complete shut down and rebuilding operation.

It can be appreciated therefore, that if the regenerator structure (e.g., the regenerator walls, crown and riders) could be fabricated from larger refractory blocks, then fewer mortar joints would ensue thereby prolonging the regenerator structure's useful life and minimizing down time due to rebuilding. The embodiments disclosed herein therefore provide such needs as monolithic crown and rider arches are now provided that can be assembled during construction or refurbishment of glass furnace regenerator structures.

SUMMARY

In general, the embodiments disclosed herein are directed toward glass furnace regenerators having opposed pairs of side and end walls formed of refractory blocks, a crown arch assembly forming an arched roof of the regenerator, and a rider arch assembly forming an interior floor of the regenerator, the rider arch defining a lower space to allow ingress/egress of combustion air and/or combustion gases into/from the regenerator below the interior floor thereof, wherein at least one of the crown arch assembly and rider arch assembly is formed of adjacently positioned one-piece monolithic pre-cast structures of refractory materials.

In some embodiments, the crown arch assembly is formed of adjacently positioned one-piece monolithic pre-cast refractory crown arches comprising upper and lower concentric arcuate surfaces defining a substantially constant arch thickness therebetween and an opposed pair of side surfaces. The crown arches may include opposed ends each having a generally vertical end face, and upper and lower downwardly and outwardly convergent mounting surfaces. According to certain embodiments, each of the opposed ends may include a substantially horizontal footer pad and/or the crown arches may include a cross-wise step joining the upper surface to each of the upper sloped mounting surfaces.

The rider arches employed in the glass furnace regenerator may be in the form of adjacently positioned one-piece monolithic pre-cast refractory rider arches comprising opposed end block regions and a central bridge region interconnecting the end block regions. The bridge region may define a substantially horizontal upper surface and an arcuate lower surface. Additionally or alternatively, the bridge region may include vertically planar opposed pairs of parallel end web sections defining therebetween a respective pair of vertically planar lateral channels, and a central web section defining therebetween a vertically planar central channel positioned between the lateral channels.

The bridge region of the rider arches according to some embodiments may include a pair of downwardly and inwardly convergent latitudinal rib elements separating the lateral channels from the central channel. The rib elements may terminate in an opposed pair of lateral spacer ribs. The spacer ribs of adjacent rider arches may therefore be in abutting contact with one another so as to define vertically oriented lateral channels and a central channel between bridge regions of the adjacent rider arches.

Embodiments of the invention also reside in each of a one-piece monolithic pre-cast refractory crown arch and a one-piece monolithic pre-cast refractory rider arch as described above for use in the glass furnace regenerator.

These and other aspects and advantages of the present invention will become more clear after careful consideration is given to the following detailed description of the preferred exemplary embodiments thereof.

BRIEF DESCRIPTION OF ACCOMPANYING DRAWINGS

The disclosed embodiments of the present invention will be better and more completely understood by referring to the following detailed description of exemplary non-limiting illustrative embodiments in conjunction with the drawings of which.

DETAILED DESCRIPTION

Figure 1:
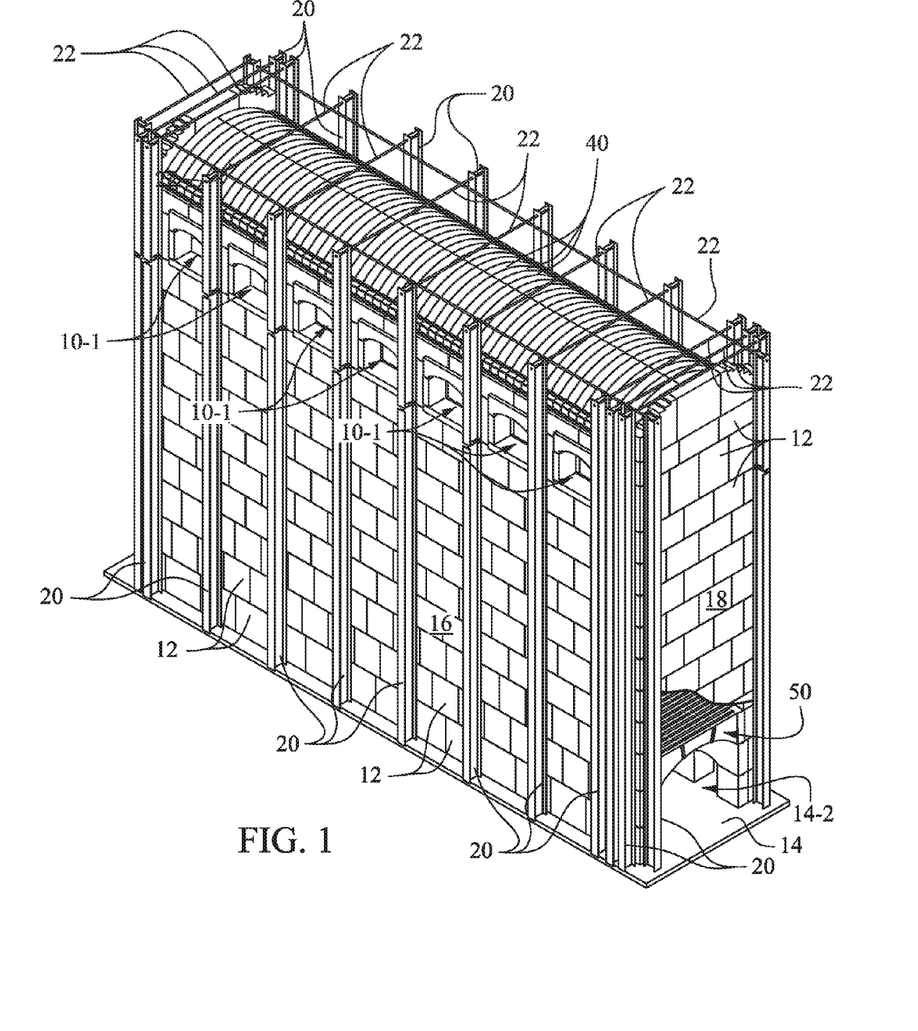
FIG. 1 is a perspective view of a regenerator structure showing the monolithic crown and rider arches in accordance with embodiments of the present invention.

Accompanying FIG. 1 schematically depicts a perspective view of a regenerator structure 10 constructed of large pre-cast refractory blocks (a few of which are identified by reference numeral 12) stacked on a foundation 14 to thereby form side and end walls 16, 18, respectively. It will be appreciated that the regenerator structure 10 is used in operative combination with a glass furnace (not shown). The regenerator structure 10 generally depicted in the accompanying FIG. 1 is of a type used for side-fired glass furnaces. However, the attributes of the embodiments of the invention to be described herein are equally applicable to other glass furnace designs, e.g. end-fired glass furnaces.

The regenerator structure 10 includes a series of ports 10-1 which are used to introduce pre-heated combustion air into the glass furnace (not shown) or to exhaust combustion gas from the furnace depending on the operational cycle. The top portion of the regenerator structure 10 is capped with a series of adjacently positioned crowns (a representative few of which are noted by reference numeral 40). An operator platform (not shown) is typically provided near the ports 10-1. The walls 16, 18 are structurally supported by external upright structural beams known colloquially as buck stays 20. As is known in the art, the buck stays 20 are compressively held against the walls 16, 18 by means of tie rods 22 extending between and interconnecting opposed pairs of buck stays 20 both latitudinally and longitudinally relative to the regenerator structure 10.

The bottom portion of the regenerator structure includes adjacently positioned rider arches 50. The rider arches are thus provided to provide a channel for the ingress/egress of combustion air and gases to/from the regenerator structure 10 and to provide a supporting floor for the checker bricks (not shown) occupying the interior volume of the regenerator structure 10 thereabove.

The various monolithic refractory components forming the walls 16, 18 as well as the crown arches 40, the rider arches 50 and the internal checker bricks (not shown) may be positioned during construction and/or refurbishment of the regenerator 10 by the assembly apparatus and methods described more fully in U.S. Provisional Patent Application Ser. No. 62/053,403 filed on Sep. 22, 2014 (the entire contents of which are expressly incorporated hereinto by reference).

Figure 2:
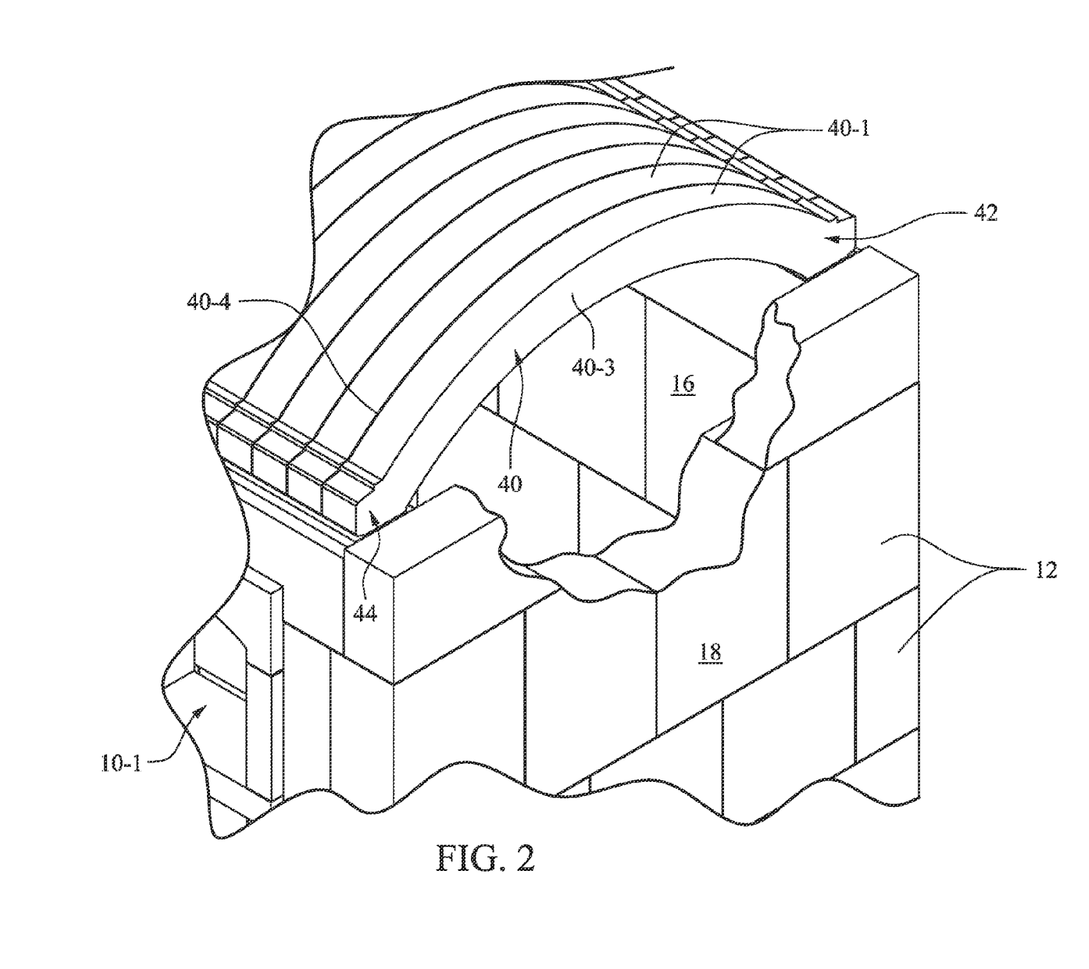
FIG. 2 is an enlarged perspective view of the upper section of the regenerator structure as shown in FIG. 1 showing the positioning of the crown arches in accordance with an embodiment of the present invention.
Figure 3:
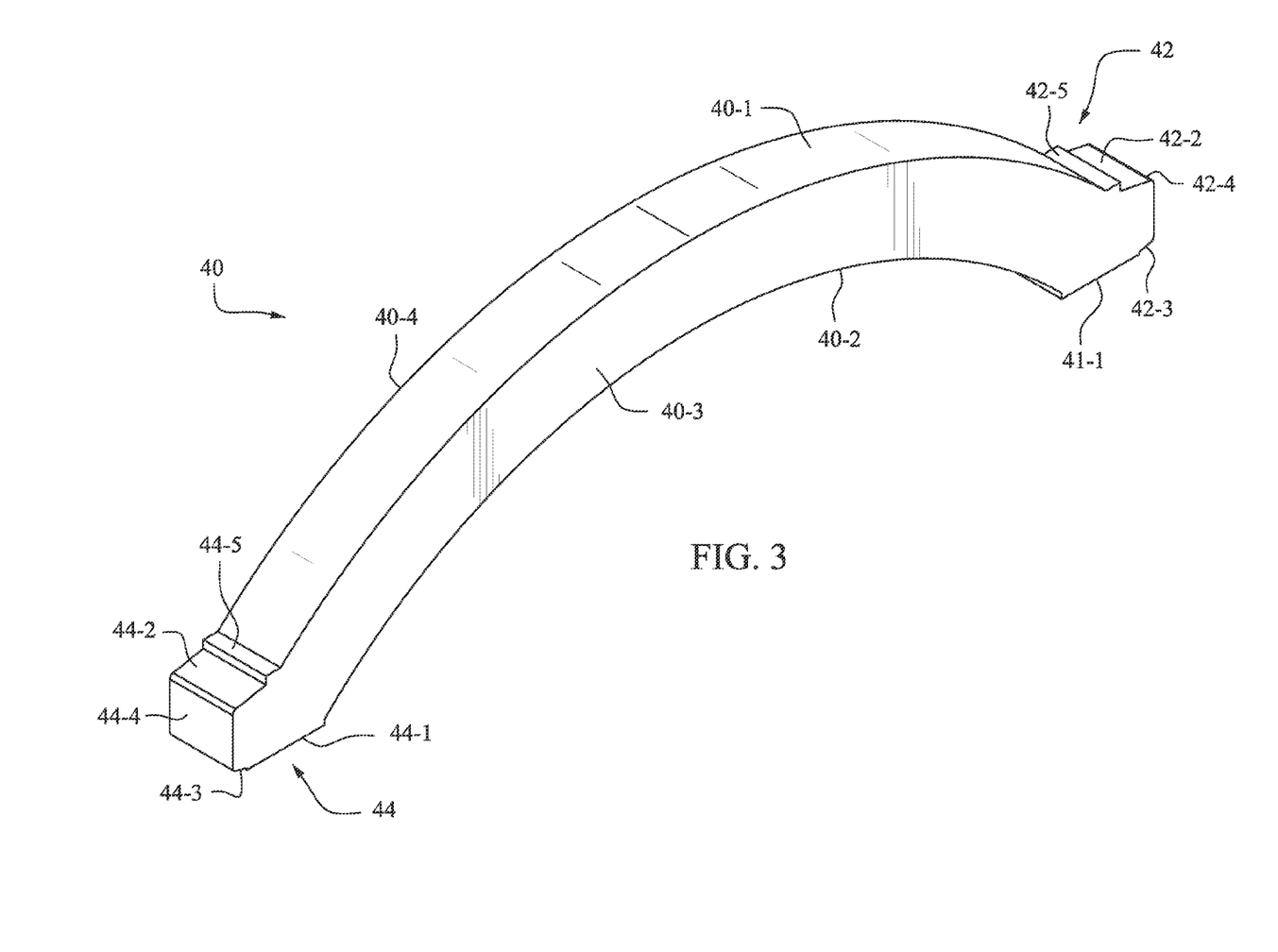
FIG. 3 is an enlarge perspective view of an exemplary crown arch in accordance with an embodiment of the present invention.

As noted above, the crown arches 40 are positioned in side-by-side adjacent relationship with one another so as to form the roof of the regenerator structure 10 (see FIG. 2). A representative crown arch 10 is shown in FIG. 3 as being a generally symmetrical one-piece pre-formed block of refractory material having concentrically positioned upper and lower arcuate surfaces 40-1, 40-2 defining a substantially constant arch thickness therebetween and opposed side surfaces 40-3, 40-4, respectively.

Figure 4:
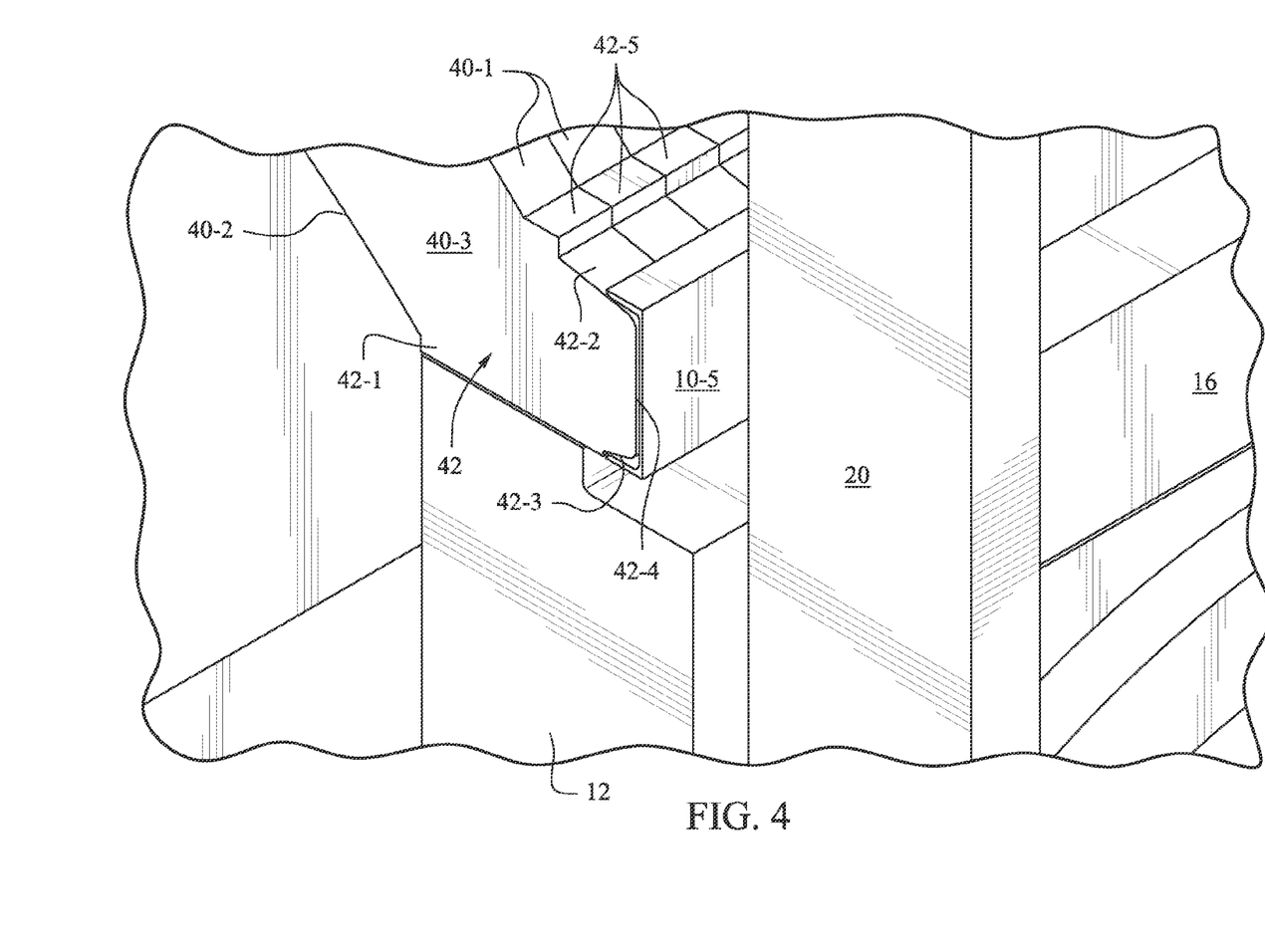
FIG. 4 is an enlarged perspective view of the terminal end portion of the representative crown arch depicted in FIG. 3 as installed with supporting structural beams associated with the regenerator structure.

The arcuate surfaces 40-1, 40-2 terminate in opposed ends 42, 44 each having a substantially horizontal footer pad 42-1, 44-1, respectively, for placement on an upper face of a terminal course of wall blocks 12 forming the side walls 16 of the regenerator structure 10 (see FIG. 4). Most preferably the arcuate surfaces 40-1, 40-2 form the generatrices of respective circular segments having concentric center points. Opposed pairs of upper and lower downwardly and outwardly sloped convergent mounting surfaces 42-2, 42-3 and 44-2, 44-3 terminate in a generally vertical end face 42-4, 44-4 at each of the opposed ends 42, 44, respectively. The mounting surfaces 42-2, 42-3 and 44-2, 44-3 are provided so that each of the ends 42, 44, respectively, may be received within a U-shaped horizontal support beam 10-5 associated with the regenerator structure 10 (see FIG. 4). A cross-wise step 42-5, 44-5 joins the upper surface 40-1 to each of the upper sloped mounting surfaces 42-4, 44-4 at each of the ends 42, 44, respectively.

Figure 5:
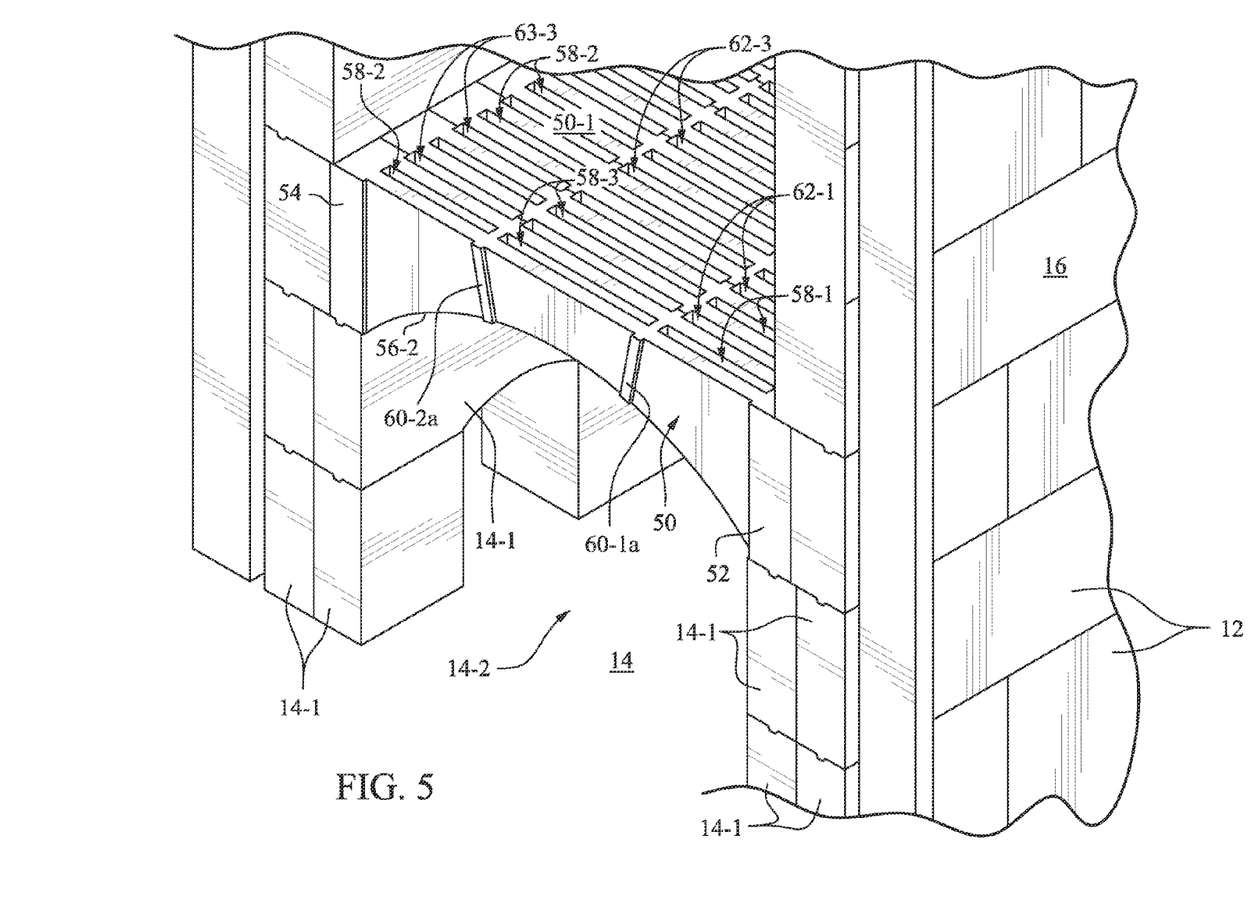
FIG. 5 is an enlarged perspective view of the lower section of the regenerator structure as shown in FIG. 1 showing the positioning of the rider arches in accordance with an embodiment of the present invention.

As is shown in FIG. 5, a plurality of rider arches 50 are positioned in adjacent side-by-side relationship at the bottom of the regenerator structure 10. Each of the rider arches 50 is supported above the foundation floor 14 by foundation blocks 14-1 so as to define a space 14-2 below the rider arches 50 to allow the ingress/egress of combustion air into/out of the regenerator structure 19. The upper substantially horizontal surfaces 50-1 of the rider arches 50 thus define a substantially horizontal floor for supporting checker bricks (not shown) as was described previously. Each rider arch 50 is most preferably a generally symmetrical one-piece pre-formed block of refractory material.

Figure 6:
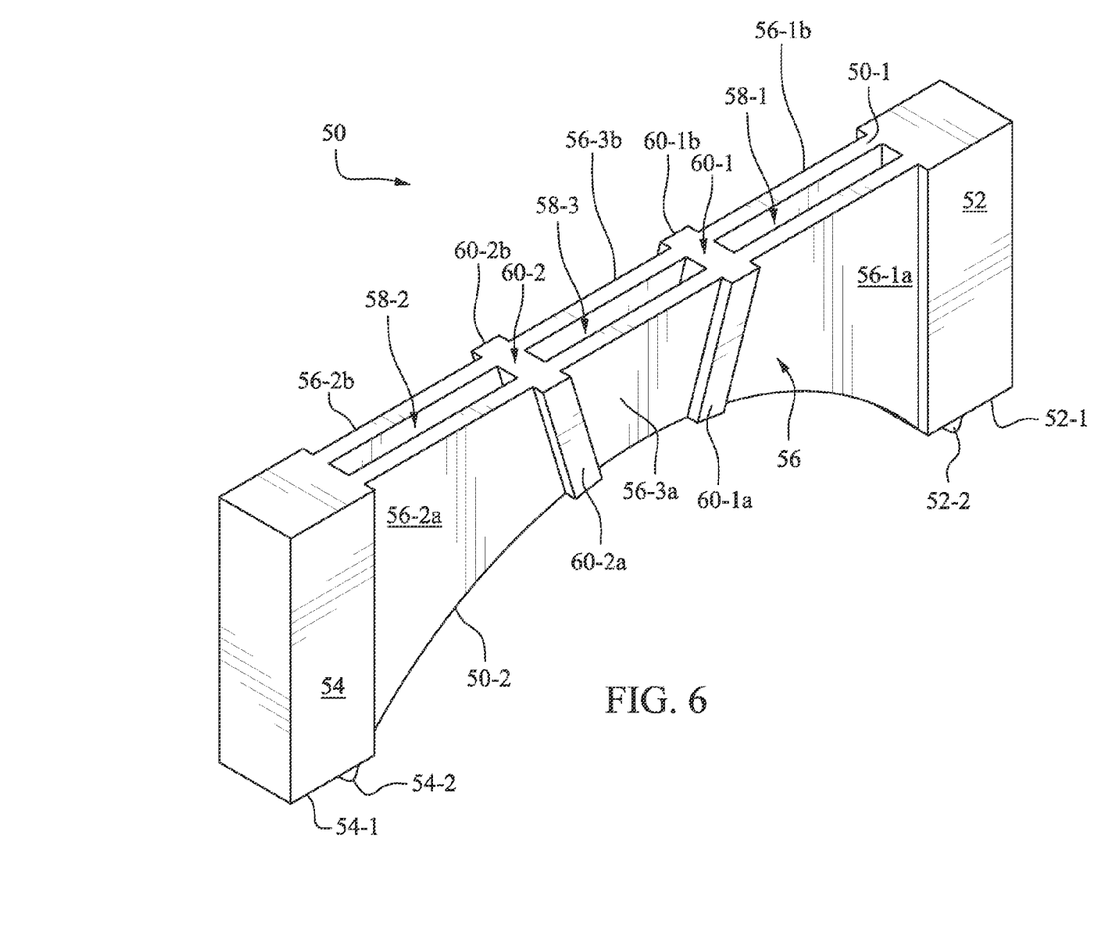
FIG. 6 is an enlarged perspective view of an exemplary rider arch in accordance with an embodiment of the present invention.
Figure 7:
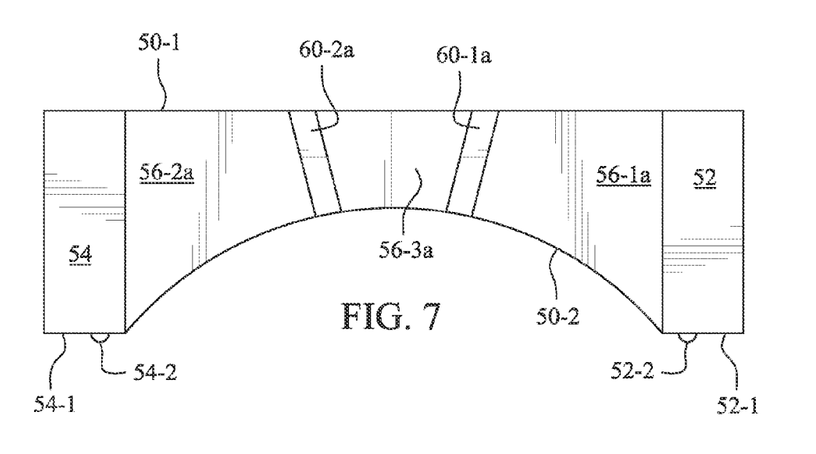
FIG. 7 is a side elevational view of the rider arch depicted in FIG. 6.
Figure 8:
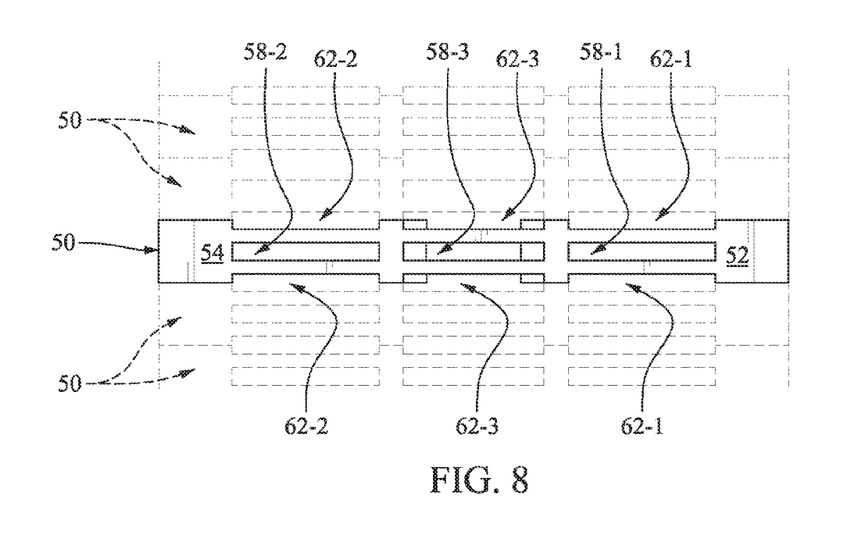
FIG. 8 is a top plan view of the rider arch depicted in FIG. 6 showing adjacently positioned rider arches in dashed lines.

An exemplary rider arch 50 is depicted in FIGS. 6-8 and includes opposed end block regions 52, 54 interconnected to one another by a central bridge region 56. The end block regions 52, 54 are generally vertically oriented and are adapted for being stacked onto a respective one of the foundation blocks 14-1. In order to provide interlocking relationship with the foundation blocks 14-1 and to minimize loss of combustion air and gasses, the bottom surface 52-1, 54-1 of each end block 52, 54 is provided with an elongate tongue 52-2, 54-2 cooperating with an correspondingly shaped groove formed on an upper surface of the immediately subjacent foundation block 14-1.

The central bridge region 56 is unitarily formed with the end block regions 52, 54 and defines the upper horizontal surface 50-1 of the rider arch 50. The bridge region 56 also includes a lower arcuate surface 50-2 opposite to the upper horizontal surface 50-1 extending from each of the lower surfaces 52-1, 54-1 of the end blocks 52, 54, respectively. An apex of the lower arcuate surface 50-2 is generally located at a latitudinal midplane of the bridge region 56.

The bridge region 56 is formed of opposed parallel vertically planar pairs of end web sections 56-1a, 56-1b and 56-2a, 56-2b, respectively, and an opposed parallel vertically planar pair of central web sections 56-3a, 56-3b. Vertical planar channels 58-1, 58-2 and 58-3 are thus defined between the opposed pairs of web sections 56-1a and 56-1b, 56-2a and 56-2b, and 56-3a and 56-3b, respectively. A pair of downwardly and inwardly convergent latitudinal rib elements 60-1, 60-2 separate the lateral channels 58-1 and 58-2 from the central channel 58-3.

Each of the rib elements 60-1, 60-2 terminate in an opposed pair of lateral spacer ribs 60-1a, 60-1b and 60-2a, 60-2b, respectively. As is perhaps better seen in FIG. 8, the lateral spacer ribs spacer ribs 60-1a, 60-1b and 60-2a, 60-2b of each rider arch 50 cooperate with adjoining spacer ribs spacer ribs 60-1a, 60-1b and 60-2a, 60-2b of an adjacently positioned rider arch 50 so as to establish collectively respective sets of vertically oriented channels 62-1, 62-2 and 62-3. Thus, the channels 58-1, 58-2 and 58-3 formed by an individual one of the rider arches 50 as well as the vertically oriented channels 62-1, 62-2 and 62-3 formed by adjacently positioned pairs of the rider arches 50 will allow combustion air and gases in the space 14-2 to communicate with the checker bricks (not shown) supported by the floor established by the upper planar surface 50-1 of the rider arches 50.

It will be understood that the description provided herein is presently considered to be the most practical and preferred embodiments of the invention. Thus, the invention is not to be limited to the disclosed embodiments, but on the contrary, is intended to cover various modifications and equivalent arrangements included within the spirit and scope thereof.

What is claimed is:

1. A glass furnace regenerator comprising:
opposed pairs of side and end walls formed of refractory blocks;
a plurality of buck stays extending vertically along an exterior of the side and end walls;
tie rods connecting opposite ones of the buck stays on the exterior of the side and end walls so as to compressively hold the buck stays against the side and end walls, respectively;
a pair of opposed U-shaped support beams each extending horizontally along an upper region of a respective side wall between the opposed end walls;
a crown arch assembly forming an arched roof of the regenerator; and
a rider arch assembly forming an interior floor of the regenerator and defining an lower space to allow ingress/egress of combustion air and/or combustion gases into/from the regenerator below the interior floor thereof, wherein
the crown arch assembly is formed of adjacently positioned one-piece monolithic pre-cast crown arch structures of refractory materials comprising upper and lower concentric arcuate surfaces defining a substantially constant arch thickness therebetween and an opposed pair of side surfaces, wherein
each crown arch structure includes opposed ends received within a respective one of the U-shaped support beams, wherein
each of the opposed ends includes a generally vertical end face, upper and lower downwardly and outwardly convergent sloped mounting surfaces, a substantially horizontal footer pad, and a cross-wise step joining the upper arcuate surface of the crown arch structure to each of the upper downwardly and outwardly convergent sloped mounting surfaces thereof.

2. The regenerator as in claim 1, wherein the rider arch assembly is formed of adjacently positioned one-piece monolithic pre-cast refractory rider arches comprising opposed end block regions and a central bridge region interconnecting the end block regions.

3. The regenerator as in claim 2, wherein the bridge region defines a substantially horizontal upper surface and an arcuate lower surface.

4. The regenerator as in claim 2, wherein the bridge region includes parallel vertically planar opposed pairs of end web sections defining therebetween a respective pair of vertically planar lateral channels, and a central web section defining therebetween a vertically planar central channel positioned between the lateral channels.

5. The regenerator as in claim 4, wherein the bridge region includes a pair of downwardly and inwardly convergent latitudinal rib elements separating the lateral channels from the central channel.

6. The regenerator as in claim 5, wherein the rib elements terminate in an opposed pair of lateral spacer ribs.

7. The regenerator as in claim 6, wherein the spacer ribs of adjacent rider arches are in abutting contact with one another so as to define vertically oriented lateral channels and a central channel between bridge regions of the adjacent rider arches.

8. A glass furnace regenerator comprising:
opposed pairs of side and end walls formed of refractory blocks;
a plurality of buck stays extending vertically along an exterior of the side and end walls;
tie rods connecting opposite ones of the buck stays on the exterior of the side and end walls so as to compressively hold the buck stays against the side and end walls, respectively;
a pair of opposed U-shaped support beams each extending horizontally along an upper region of a respective side wall between the opposed end walls;
a crown arch assembly forming an arched roof of the regenerator having opposed ends received with a respective one of the U-shaped support beams; and
a plurality of one-piece monolithic pre-cast refractor rider arch assemblies adjacently positioned to one another at a lower region of the regenerator to thereby form an interior floor of the regenerator and to define a lower space to allow ingress/egress of combustion air and/or combustion gases into/from the regenerator below the interior floor thereof, wherein each rider arch comprises opposed end block regions and a central bridge region interconnecting the opposed end block regions, the central bridge region defining a substantially horizontal upper surface and an arcuate lower surface, and wherein the central bridge region includes:
  (i) a opposed parallel vertically planar opposed pairs of end web sections defining therebetween a respective pair of vertically planar lateral channels,
  (ii) a central web section defining therebetween a vertically planar central channel positioned between the lateral channels,
  (iii) a pair of downwardly and inwardly convergent latitudinal rib element separating the lateral channels from the central channel, wherein
  (iv) the rib elements terminate in an opposed pair of lateral spacer ribs and wherein
  (v) the spacer ribs of adjacent rider arches contact one another so as to define vertically oriented lateral channels and a central channel between bridge regions of the adjacent rider arches.

9. The regenerator as in claim 8, wherein the crown arch assembly is formed of adjacently positioned one-piece monolithic pre-cast refractory crown arch structures comprising upper and lower concentric arcuate surfaces defining a substantially constant arch thickness therebetween and an opposed pair of side surfaces.

10. The regenerator as in claim 9, wherein each crown arch structure includes opposed ends received within a respective one of the U-shaped support beams, each of the opposed ends having a generally vertical end face, and upper and lower downwardly and outwardly convergent sloped mounting surfaces.

11. The regenerator as in claim 10, wherein each of the opposed ends of the crown arch structures includes a substantially horizontal footer pad.

12. The regenerator as in claim 11, wherein each of the opposed ends of the crown arch structures includes a crosswise step joining the upper arcuate surface to the upper downwardly and outwardly convergent sloped mounting surfaces.

* * * * *